United States Patent
Chomier et al.

(10) Patent No.: US 6,858,276 B1
(45) Date of Patent: Feb. 22, 2005

(54) MIXED ARTICLES COMPRISING A RIGID PART AND A BASED ON A THERMOPLASTIC MATERIAL

(75) Inventors: Didier Chomier, St-Romain en Jarez (FR); Marcel On De Laak, Freiburg (DE); Gerhard Potsch, Freiburg (DE)

(73) Assignee: Rhodia Engineering Plastics S.A., Saint-Fons (FR)

( * ) Notice: Subject to any disclaimer, the term of this patent is extended or adjusted under 35 U.S.C. 154(b) by 0 days.

(21) Appl. No.: 09/937,381

(22) PCT Filed: Mar. 21, 2000

(86) PCT No.: PCT/FR00/00703

§ 371 (c)(1),
(2), (4) Date: Apr. 25, 2002

(87) PCT Pub. No.: WO00/56517

PCT Pub. Date: Sep. 28, 2000

(30) Foreign Application Priority Data

Mar. 23, 1999 (FR) .............................. 99 03766
Dec. 30, 1999 (FR) .............................. 99 16711

(51) Int. Cl.[7] .............................................. B29D 22/00
(52) U.S. Cl. ...................... 428/35.7; 264/36; 264/257; 264/259; 264/266; 264/271.1; 264/274; 264/296; 264/321; 264/324; 264/328.12; 264/513; 264/516; 264/572; 428/67
(58) Field of Search .................... 428/35.7, 67; 264/36, 264/257, 259, 266, 271.1, 274, 296, 321, 324, 328.12, 513, 516, 572, 515, 524

(56) References Cited

U.S. PATENT DOCUMENTS

| 3,242,239 A | | 3/1966 | Schafer ........................ 264/36 |
| 4,968,474 A | | 11/1990 | Ito .............................. 264/513 |
| 5,049,349 A | * | 9/1991 | McCullough et al. ....... 264/515 |
| 5,190,803 A | * | 3/1993 | Goldbach et al. ........... 428/138 |
| 5,456,957 A | * | 10/1995 | Jackson et al. ............... 428/31 |
| 5,599,599 A | * | 2/1997 | Mirmiran et al. .......... 428/36.3 |

FOREIGN PATENT DOCUMENTS

| DE | 27 16 676 | 10/1978 |
| DE | 34 29 883 | 4/1985 |
| EP | 0 320 925 | 6/1989 |
| EP | 0 322 285 | 6/1989 |
| EP | 0 370 342 | 5/1990 |
| FR | 2 191 577 | 1/1974 |

OTHER PUBLICATIONS

Patent Abstracts of Japan, vol. 1996, No. 3, Mar. 29, 1996 & JP 07299841 A, Nov. 14, 1995.
Patent Abstracts of Japan, vol. 15, No. 267, Jul. 8, 1991 & JP 03090330 A, Apr. 16, 1991.

* cited by examiner

Primary Examiner—Sandra M. Nolan
(74) Attorney, Agent, or Firm—Burns, Doane, Swecker & Mathis, L.L.P.

(57) ABSTRACT

The invention concerns the production of articles comprising at least a rigid element (1) and at least an element (2) made of a thermoplastic material obtained by moulding. The rigid element (1) has a profiled transverse section defining a concave space, wherein is positioned at least partly an element made of thermoplastic material.

24 Claims, 5 Drawing Sheets

Photo 1

MIXED ARTICLES COMPRISING A RIGID PART AND A BASED ON A THERMOPLASTIC MATERIAL

The present invention relates to the production of articles comprising at least one rigid element and at least one element consisting of a thermoplastic material obtained by molding.

In the fields of industry relating to the fabrication of manufactured objects, for example in the building, furnishing, automobile and consumer-goods fields, the articles produced have in general to be light in weight and to have the properties needed for use, particularly sufficiently good mechanical properties. In order to meet these specifications, the choice of the materials and the shape conferred upon them are determining factors.

The past few decades have seen the development of the use of plastics, for example in the automobile or construction fields, which are lighter in weight and easier to work than metals. It is thus possible to fabricate lightweight articles with complex shapes, for example by injecting a molten polymer into a mold.

However, the use of plastics may, in certain areas, be limited. For example, the production of large components may pose problems of dimensional stability, particularly in applications where they are subjected to variations in temperature or to vibration. This is the case in particular in the automotive sphere, for certain components located under the hood. Furthermore, the components made of plastic may have mechanical properties which are not good enough for the application considered.

In order to overcome this type of difficulty it is known practice for various materials, for example metal elements and elements made of thermoplastic material to be combined. Numerous publications exist regarding structures that can be adopted for adapting components comprising plastics and additional elements suitable for the use for which they are intended. By way of example, mention may be made of the published patent application DE-4334049 which teaches the insertion of metal components in sheets of plastic, published patent application DE-4330273 which teaches the reinforcing of plastic window frames using profiled metal rods. Published patent application EP 370342 teaches the reinforcing of a metal structure of U-shaped profile with ribs made of thermoplastic material injected into the metal structure.

The objective of the present invention is to propose novel articles in which at least one element consisting of a thermoplastic material and one rigid element, for example made of metal, are combined, the articles according to this structure in particular having good dimensional stability and good impact behavior.

To this end, the invention proposes an article comprising a part consisting of a rigid element of elongate shape, at least one past of which has a cross section which has a profile defining a concave space, and comprising at least one part made of thermoplastic material associated with the rigid element and positioned in the concave space, characterized in that the part made of thermoplastic material is in contact on at least two lines which are continuous in the longitudinal direction, and in that the part made of thermoplastic material has a cross section comprising at least one hollow.

The part made of thermoplastic material can be used as a reinforcement of a lightweight rigid element, for example for producing building elements. These building elements are generally of straight or curved elongate shape, in the form of shells or tubular, consisting of one or more segments. Examples of such articles that may be mentioned are beams and girders. The preferred areas of application for this type of article are the building, furnishing and automotive construction fields, for producing structural components intended to support other components. The articles reinforced in that way have the advantage of being light in weight while at the same time maintaining mechanical properties which are good enough, for example, to support other structures. In particular, the rigid element allows the loads to be spread over the entirety of the article and the part made of thermoplastic material reinforces the article.

The part of the article made of thermoplastic material may have numerous functions, the rigid element serving to reinforce or to stabilize the shape made of thermoplastic material. The part made of thermoplastic material may have a highly complex structure with, for example, spaces for accommodating other components, reinforcing ribs, means of assembly with other components or systems, for example clips. The rigid element may be fully incorporated into the structure defined by the part made of thermoplastic material, may be visible or may be completely inserted into the thermoplastic material. It may be used as a simple structure reinforcing element or have functions of its own. It may, for example, have means of assembly with other components. Such structures have better dimensional stability than structures made solely from thermoplastic materials. The dimensional variations of the plastic parts are in fact limited by those of the rigid element with which they are in contact. It is thus possible to produce very large components based on a thermoplastic material. Another advantage of such structures is the improvement in the impact behavior, that is to say the ability of an object not to be broken into several parts after an impact. The articles according to this embodiment art therefore particularly suited to the production of automotive components, for example the production of front faces.

The articles according to the invention can be used as they are as consumer goods or may be combined with other components, elements or system, for example by bonding, welding, riveting, insetting or clipping.

The article according to the invention may in particular comprise one or more parts made of thermoplastic material and the cross section of which has at least one hollow. If it has several of these, the parts made of thermoplastic material may be materially separated or form part of one and the same material element made of thermoplastic material. Thus, two parts made of thermoplastic material of hollow cross section, positioned in the concave space may, for example, be joined together by a base made of thermoplastic material. The connecting means may be contained inside or outside the concave space of the rigid element. The elements made of thermoplastic material are generally shaped by molding.

The rigid element has a straight or curved elongate shape. It may also have several essentially elongate portions separated for example by elbows or changes in curvature. It is possible, for these shapes, to define a cross section perpendicular to the longitudinal direction. The rigid element and the part made of thermoplastic material are in contact along at least two lines which are continuous in the longitudinal direction. The lines of contact may be straight, curved, parallel to the longitudinal direction or at an angle to this direction. The expression "contact along at least two lines" is to be understood as meaning that, for any cross section, the rigid element and the part made of thermoplastic material are in contact at least at two points on the profile defining the concave space. The rigid element and the part made of thermoplastic material are preferably in contact along continuous surfaces.

The part made of thermoplastic material and the rigid element are advantageously in contact over the entirety of the profile or over portions of the profile, preferably over at least two portions. The part made of thermoplastic material may, for example, rest on the rigid element on continuous strips of contact.

The part made of thermoplastic material and positioned in the concave space of the rigid element is hollow, that is to say that, over at least one part, it has a cross section that has a space which is completely surrounded by thermoplastic material.

According to a first embodiment of the invention, the article comprises a part made of thermoplastic material having a profile that is the conjugate of the concave space defined by the profile of the rigid element. According to this embodiment, the part made of thermoplastic material fills the concave space fully or to a large extent, the part made of thermoplastic material and the rigid element being in contact over the entirety or over the majority of the section.

For this first embodiment, the rigid elements comprise, for example, a part in the shape of a U, a V, a semicircle, possibly with flats. The rigid elements may also have a closed cross section. The oppression "closed cross section" is to be understood as meaning any geometric shape for which it is possible to define a perimeter such as a circle, a rectangle with right-angled or rounded corners, an ellipse, an oval, etc. The rigid element may, for example, be tubular. The concave space is therefore defined by the space situated inside the perimeter.

According to a second embodiment of the invention, the article comprises at least two hollow parts made of thermoplastic material and the profile of the rigid element is defined by at least one base and two opposed walls defining corners in which each of the parts is positioned. Each part made of thermoplastic material rests against the base and one of the walls, the wall relative to the corner in which the part made of thermoplastic material is positioned. For this embodiment, the rigid element advantageously comprises, on at least one part, a section with a profile in the shape of a U or an I. The two parts for example have a tubular shape.

The article may advantageously comprise reinforcing ribs made of thermoplastic material, resting at least partly on the parts made of thermoplastic material positioned in the corners. For example, the ribs are preferably in the form of zig-zags or Xs, or consist of parallel panels connecting the parts positioned in the corners. They are preferably produced during the step of shaping the thermoplastic material, the hollow parts and the ribs forming one selfsame element.

The articles according to the invention may be produced by assembling the rigid element with one or more preformed elements made of thermoplastic material. The elements may, for example, be secured by embossing, welding, bonding, riveting or clipping.

The articles may advantageously be produced by molding parts made of thermoplastic material inside the concave space. The thermoplastic material may have parts extending beyond the concave space, in addition to the hollow parts. The molding techniques are well known to those skilled in the part. To perform shaping inside the concave space, the rigid element is, for example, placed in a mold of suitable shape then liquid thermoplastic material is injected.

The articles according to the invention may, for example, be fabricated using a fluid-injection method. The expression "fluid-injection" is to be understood as meaning any method comprising a step in which a fluid, for example a gas or water, is injected into a mass of molten polymer to create a cavity therein. All embodiments which can fall under this heading can be used in the context of the invention.

Among these methods, the gas-injection technique, which is developing strongly, may be used. In brief, this technique consists, in a first embodiment, in injecting into a mold of a shape corresponding to that of the component that is to be molded, a certain amount of material which is not enough to completely fill the mold. Then, a needle is introduced, at one or more points, into the mass thus injected so that a gas can be fed in under pressure. The gas will generate a cavity in the injected molten mass, forcing the polymer to hug the walls of the mold. After cooling, the component is released from the mold. In a second embodiment, the mold is completely filled with the thermoplastic composition, gas under pressure is injected into said mass to expel some of the material from the mold and thus form a cavity while at the same time keeping some of the material against the walls of the mold until such time as this material sets or solidifies.

These techniques are used in particular for producing thick-walled components or for reducing the amount of material in solid components.

By way of an example of a description of a gas-injection method, mention may be made of the article entitled "Gas Injection Molding: Current Practices" by S. SHAH published in the journal "ANTEC-91"—pages 1494 to 1506.

Applications of this technique and examples of components produced using it are given in the article entitled "Gas Injection Molding: Structural application", by S. SHAH and D. HLAVATY, published in the same journal as above on pages 1479–1493.

A description of the gas-injection methods known under the tradename CINPRESS is also given in the article "IM Alternatives Produce Performance Advantages" by John Theverge published in the February 1991 edition of "Plastics Engineering" (pages 27–31).

Mention may also be made of the article "Neue Möglichkeiten beim Spritzgiessen durch das Gasinnendruckverfahren [New ways of injection molding using the gas internal pressure process]", by B. KLOTZ and E. BÜRKLE published in Kunststoffe 79 (1989) No. 11, pages 1102–1107.

The articles according to the invention may, for example, be produced according to a method comprising the following steps:

a) arranging, in an injection mold of chosen shape, a preformed rigid element one cross section of which has at least one part defining a concave space, b) injecting molten thermoplastic material into the mold, c) injecting a fluid, preferably a gas, through a needle into the molten thermoplastic material present in the concave space of the rigid element.

Another method that is suitable for the invention consists in shaping the rigid element in the tool for molding the element made of the thermoplastic material, such a method comprising, for example, the following steps;

a) arranging, in an injection mold of chosen shape, a rigid element that is to be preformed, b) preforming the rigid element by pressing or by hot forming in the mold, the preform having a cross section which has at least one part defining a concave space, c) injecting molten thermoplastic material into the mold, d) injecting a fluid, preferably a gas, through a needle into the molten thermoplastic material present in the concave space of the rigid element.

According to another embodiment of the invention, the articles according to the invention are fabricated using an extrusion-blow-molding method.

The rigid element and the element made of thermoplastic material may be secured by any known means, for example bonding, riveting or overmolding. A particularly advantageous means of securing is for the injected material to protrude through perforations made in the rigid element. Another particularly advantageous means is for the rigid element to be completely or partially overmolded with the element made of thermoplastic material.

According to a preferred embodiment, the rigid element is a metal component. It may, for example, be obtained by pressing a metal plate or sheet. Steel sheet, particularly those which have not been treated or galvanized and/or primed and possibly treated with an adhesion promoter, and aluminum sheets which have not been treated or anodized and/or primed and possibly treated with an adhesion promoter are particularly well suited.

According to another embodiment, use may be made, by way of rigid elements, of sheets of plastic shaped by hot pressing and which are made up of thermoplastics into which may be inserted plies of glass fibers or plies of synthetic fibers, such as laminates.

To produce components according to the invention, use may be made of any thermoplastics that can be shaped by molding and, more particularly, by fluid-injection methods. By way of example, mention may be made of partially crystalline plastics such as nylon-6, nylon-6,6, polybutylene terephthalate, polyphthalamide, polyphenylene sulfide, semiaromatic polyamides, and polypropylene.

Use may also be made of any composition produced from these materials. It is advantageously possible to use compositions which are reinforced, for example with fillers chosen from the group comprising glass fibers, mineral fibers, for example wollastonite, ceramic fibers, heat-resistant organic fibers such as polyphthalamide fibers, inorganic fillers such as kaolin, lamellar silicates, possibly modified, such as montmorillonite, and fluoromicas. The compositions may comprise all additives conventionally used on polyamide-based compositions used for the fabrication of molded articles. Thus, by way of example of additives, mention may be made of heat stabilizers, UV stabilizers, antioxidants, lubricants, pigments, colorants, plasticizers or impact modifiers. By way of example, the antioxidants and heat stabilizers are, for example, alkali-metal halides, copper halides, sterically hindered phenolic compounds, and aromatic amines. The UV stabilizers are generally benzotriazoles, benzophenones or HALSs.

By way of particularly suitable applications for such lightweight structural elements mention may be made of strong elements for motor vehicle doors, bumper supports, front and rear faces for motor vehicles, and the lower parts of vehicle bodies. These articles generally are required to have great solidity and good rigidity.

The hollow part of the element made of thermoplastic material may advantageously be used to transfer fluids, for example air, water, glycol-containing water, fuels and oil. For this purpose, the part made of thermoplastic material of hollow cross section may comprise means for letting fluids into and out of the interior of the hollow part. The components thus produced may be used in a fluid-transfer device. The articles according to the invention may also be used to produce heat exchangers, for example for producing motor vehicle radiators, the fluid that needs to be cooled flowing through the hollow part of the element made of thermoplastic material and the heat exchange being with the external surroundings. If the article comprises several hollow parts made of thermplastic material, these various parts may be used for transferring fluids of different natures.

Other details or advantages of the invention will become more clearly apparent in the light of the example given hereinbelow and purely by way of indication and illustrated in FIGS. 1 to 3 in which.

Figure 1:
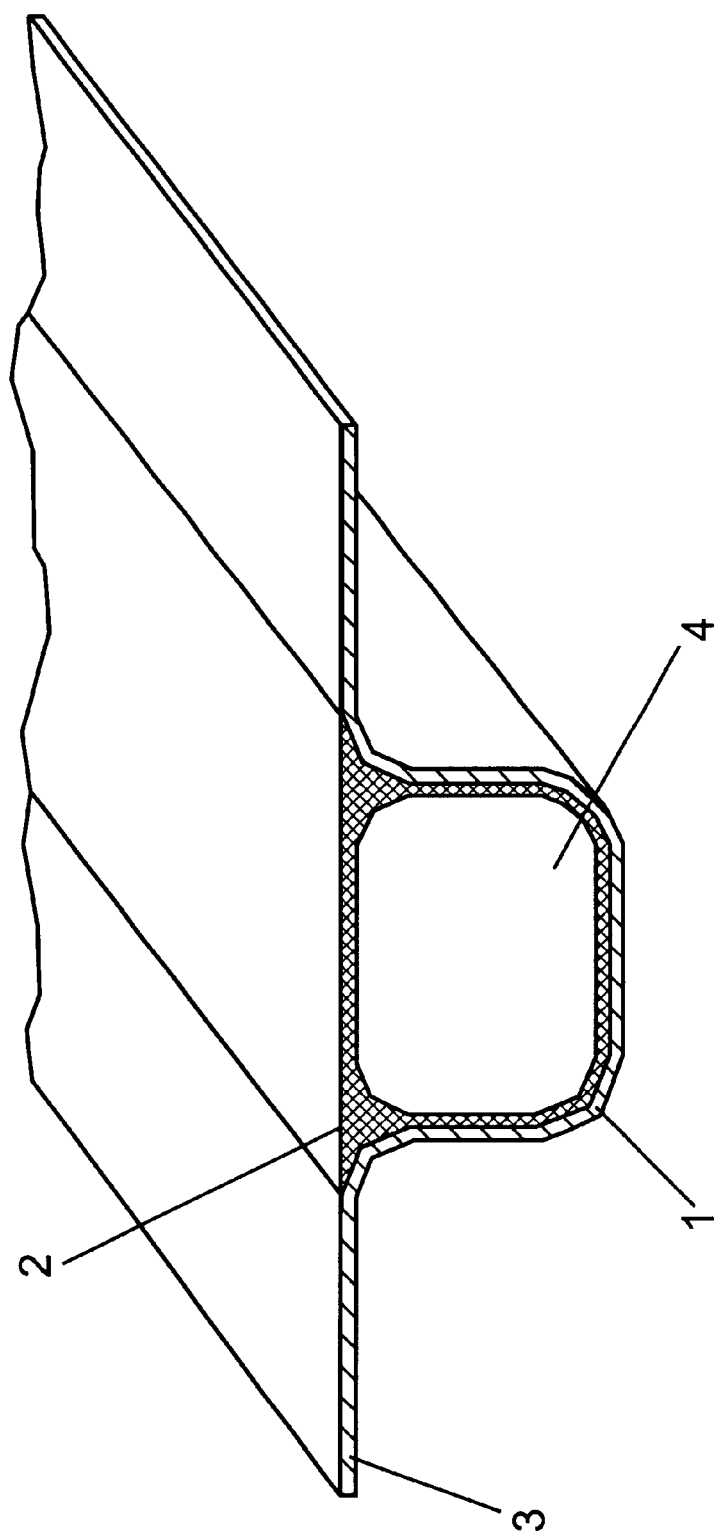
FIG. 1 depicts a three-dimensional part view of an article according to a first embodiment of the invention.
Figure 5:
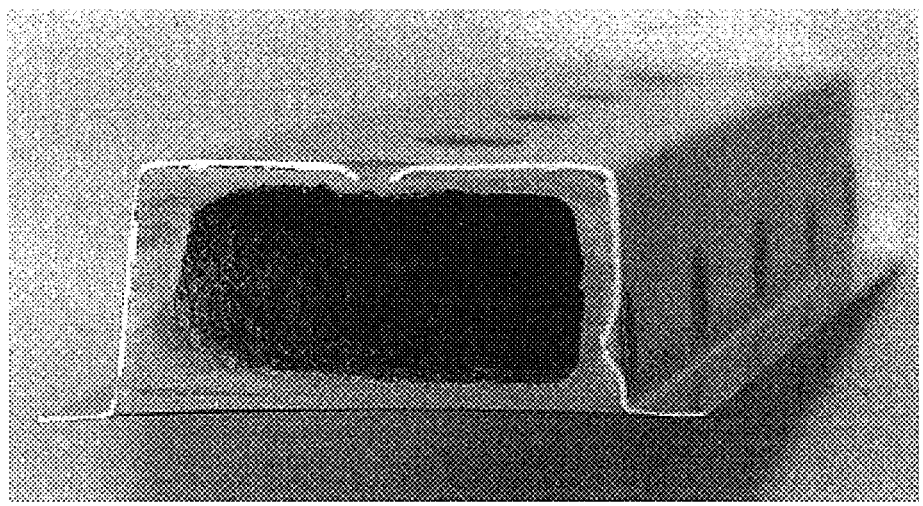

FIG. 1 depicts a three-dimensional part view of an article according to a first embodiment of the invention. The article comprises a rigid element 1 of rectilinear elongate shape and a part made of thermoplastic material 2. The rigid element is a pressed sheet with a U-shaped section, the ends of which U each have a flat 3. The region lying between the branches of the U defines a concave space in which the part made of thermoplastic material is placed. The shape of the part made of thermoplastic material is the conjugate of that of the rigid element. The part made of thermoplastic material placed inside the concave space has a hollow 4. The assembly has excellent rigidity. The means of securing the rigid element and the part made of thermoplastic material together are not depicted in this figure; they are visible in FIG. 5.

Figure 4:
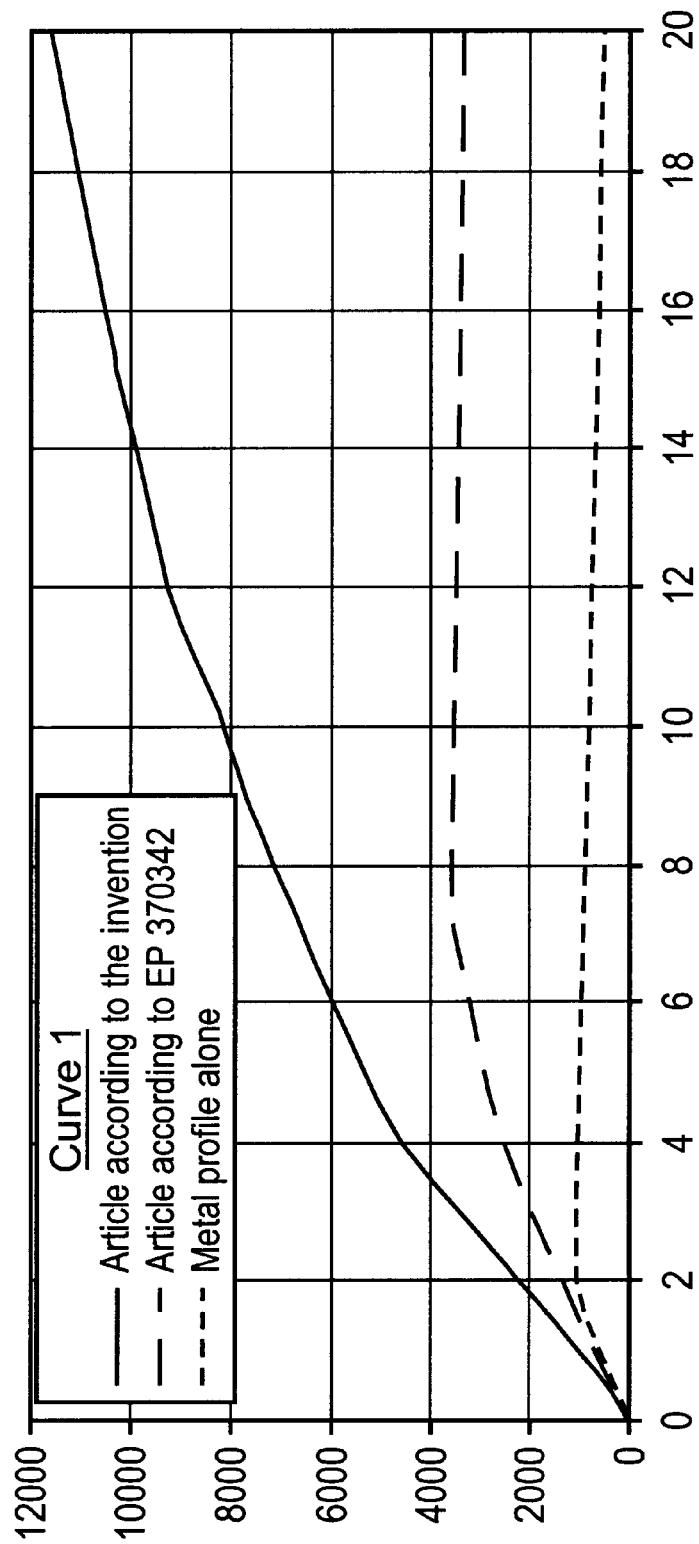

FIG. 4 represents the banding curves, obtained under the same conditions, for various structures: a structure according to the first embodiment, a structure according to document EP 370342, and a structure having only the metal profile. The X-axis represents the displacement in mm, and the Y-axis represents the force in N.

The article depicted in FIG. 1 may, for example, be produced by placing the rigid element 1 in an injection mold of chosen shape so that a fluid can be injected into the space located between the walls of the mold and the interior walls of the rigid element defining the dish shape. Molten nylon-6,6 is injected into this shape, then gaseous nitrogen is injected into the mass of molten polyamide using nozzles situated in the mold at the two ends of the location where the rigid element is held. Once the polyamide has solidified, the fabricated article is released from the mold. The part made of thermoplastic material 2 has a hollow 4.

Figure 2:
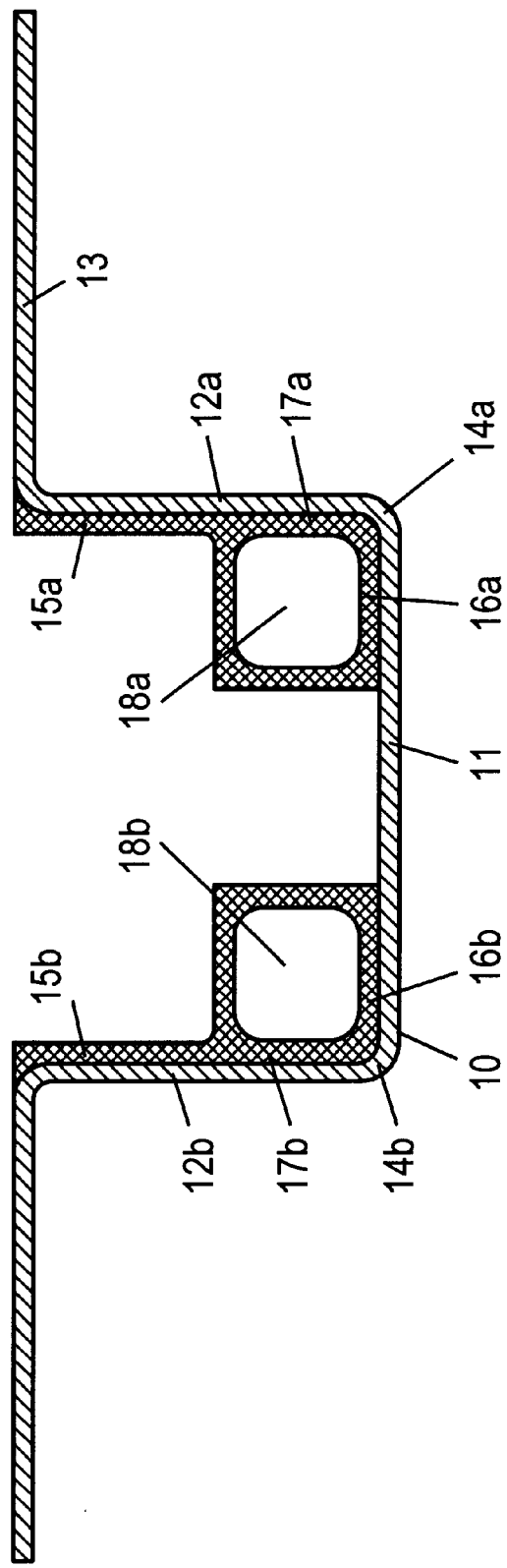
FIG. 2 depicts a cross section through an article according to a second embodiment of the invention.

FIG. 2 depicts a cross section through an article according to a second embodiment. The article comprises a rigid element 10 in the shape of a U, with a base 11 and two opposed walls 12a, 12b forming the two branches of the U. The ends of the U have flats 13. The base and the walls form corners 14a; 14b. The article comprises two parts made of thermoplastic material 15a; 15b each positioned at least partly in the corners 14a; 14b. Each of the two parts made of thermoplastic material bears against the base 16a; 16b and against that wall relating to the corner in which it is positioned 17a; 17b. Each of the parts positioned in the corners has a tubular portion with a hollow 18a; 18b. The means of securing the rigid element and the part made of thermoplastic material together are not depicted in this figure.

Figure 3:
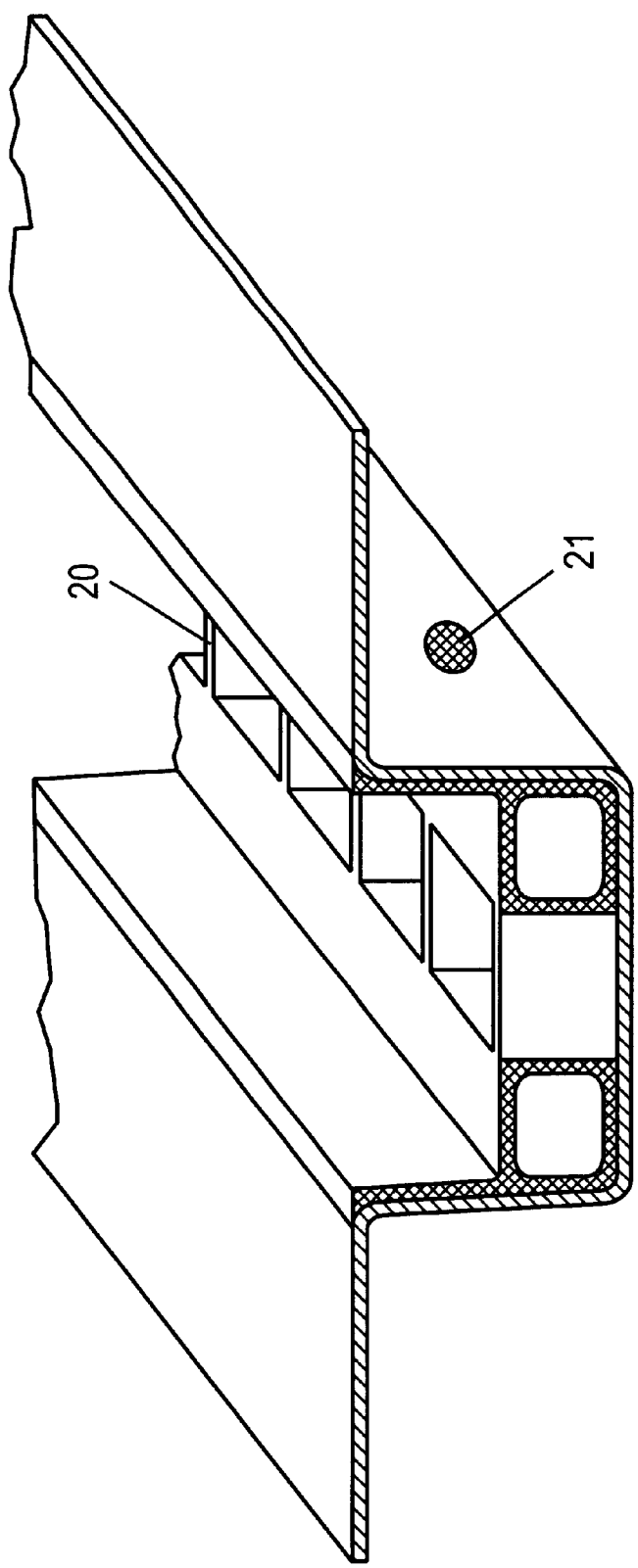
FIG. 3 depicts a three-dimensional part view of an article according to a third embodiment of the invention.

FIG. 3 depicts a three-dimensional part view of an article according to a third embodiment of the invention. The profile of the article according to this embodiment is similar to the one depicted in FIG. 2. The article additionally comprises reinforcing ribs 20 between the two parts made of thermoplastic material which are positioned in the corners. The rigid element and the parts made of thermoplastic material are secured by some thermoplastic material protruding 21 through an orifice pierced in the rigid element.

What is claimed is:

1. An article comprising a part comprising a rigid metal or thermoplastic element of elongate shape, at least one part of which has a cross section which has a profile defining a concave space, and comprising at least one part made of thermoplastic material associated with the rigid element and positioned in the concave space of the rigid element, wherein the part made of thermoplastic material is in contact on at least two lines which are continuous in the longitudinal direction, and in that the part made of thermoplastic material has a cross section comprising at least one hollow.

2. The article as claimed in claim 1, wherein the part made of thermoplastic material positioned in the concave space of the rigid element presents a conjugate profile to the concave space defined by the profile of the rigid element.

3. The article as claimed in claim 2, wherein the cross section of the rigid element is closed.

4. The article as claimed in claim 1, wherein the profile of the rigid element is defined by at least one base and two opposed walls defining two corners with the base and in that it comprises at least two parts made of thermoplastic material with hollow cross sections positioned in each corner, each of these parts resting along at least one portion of the base and at least one portion of the wall relative to the corner in which it is positioned.

5. The article as claimed in claim 3, wherein the profile of the rigid element is in the shape of a U or an I.

6. The article as claimed in claim 4, which comprises reinforcing ribs made of thermoplastic material resting at least partly on the parts made of thermoplastic materials positioned in the corners defined by the walls and the base.

7. The article as claimed in claim 1, which is obtained by assembling a rigid element and at least one molded element made of thermoplastic material.

8. The article as claimed in claim 7, wherein the rigid element and the molded element are assembled by insetting, welding, bonding, riveting or clipping.

9. The article as claimed in claim 1, wherein the part made of thermoplastic material is shaped by molding inside the concave space.

10. The article as claimed in claim 9, wherein the shaping is performed by a fluid-injection technique.

11. The article as claimed in claim 9, wherein the part made of thermoplastic material and the rigid element are secured by the protrusion of thermoplastic material through perforations made in the rigid element.

12. The article as claimed in claim 9, wherein the part made of thermoplastic material and the rigid element are secured by complete or partial overmolding of the rigid element.

13. The article as claimed in claim 1, wherein the rigid element is a tubular or profiled metal component.

14. The article as claimed in claim 1, wherein the thermoplastic material is a polyamide.

15. The article as claimed in claim 1, wherein the part made of thermoplastic material of hollow cross section comprises means for letting a fluid into and out of the interior of the hollow part.

16. A fluid-transfer device comprising the article as claimed in claim 1.

17. The fluid-transfer device as claimed in claim 16, wherein the fluids are selected from the group consisting of air, water, water containing glycol, fuels and oils.

18. A method for producing motor vehicle front face components comprising using the article as claimed in claim 1.

19. A heat-exchange device comprising the article as claimed in claim 1.

20. A method for fabricating an article comprising at least one rigid metal or thermoplastic element a cross section of which has at least one part defining a concave space and comprising at least one element made of a molded thermoplastic material, comprising at least the following steps:

a) arranging, in an injection mold of chosen shape, a preformed rigid metal or thermoplastic element one cross section of which has at least one part defining a concave space, b) injecting molten thermoplastic material into the mold, and c) injecting a fluid or a gas, through a needle into the molten thermoplastic material present in the concave space of the rigid element.

21. A method for fabricating an article comprising at least one rigid metal or thermoplastic element a cross section of which has at least one part defining a concave space and comprising at least one element made of a molded thermoplastic material, comprising at least the following steps:

a) arranging, in an injection mold of chosen shape, a rigid metal or thermoplastic element that is to be preformed, b) preforming the rigid element by pressing or by hot forming in the mold, the preform having a cross section which has at least one part defining a concave space, c) injecting molten thermoplastic material into the mold, and d) injecting a fluid or a gas, through a needle into the molten thermoplastic material present in the concave space of the rigid element.

22. The article of claim 1, wherein the rigid element comprises a reinforced thermoplastic.

23. The method of claim 20, wherein step (a) comprises arranging, in the injection mold of chosen shape, a preformed rigid reinforced thermoplastic element.

24. The method of claim 21, wherein step (a) comprises arranging, in the injection mold of chosen shape, a rigid reinforced thermoplastic element that is to be preformed.

* * * * *